UNITED STATES PATENT OFFICE.

GOTTLIEB DEUMELANDT, OF POTSDAM, PRUSSIA, GERMANY.

PROCESS OF SEPARATING BASIC COMPOUNDS FROM SLAGS.

SPECIFICATION forming part of Letters Patent No. 318,603, dated May 26, 1885.

Application filed November 22, 1884. (No specimens.) Patented in Belgium September 30, 1884, No. 66,351; in England October 16, 1884, No. 12,595, and in France December 10, 1884, No. 165,857.

*To all whom it may concern:*

Be it known that I, GOTTLIEB DEUMELANDT, doctor of philosophy, a subject of the King of Prussia, Germany, residing at the city of Potsdam, in the Kingdom of Prussia, Germany, have invented certain new and useful Improvements in Methods of Treating Basic Slags and Utilizing the Free Bases Contained Therein, (for which Letters Patent have been heretofore granted to me by the Government of Belgium, dated September 30, 1884, No. 66,351; France, dated December 10, 1884, No. 165,857, and Great Britain, provisional protection, dated October 16, 1884, No. 12,595,) of which the following is a specification.

This invention relates to an improved process for treating basic slags with suitable menstruums for the purpose of utilizing the free bases contained in the same, and regenerating at the same time the menstruums employed, so as to use them over again.

The invention consists of the process of removing the free bases contained in the basic slag by treating the pulverized slag with a menstruum containing ammonium salt and removing the free bases contained therein successively or jointly by filtering the solution and treating the residue with air and carbonic acid.

The basic slags obtained in the Thomas-Gilchrist process of dephosphorizing iron contain, besides phosphates and silicates, lime, magnesia, manganous oxide, alumina, and ferrous oxide as free bases that are not combined with any acid. The bases referred to are treated with ammonium salts, the acid constituents of which form soluble salts with free bases mentioned—such as ammonium chloride, ammonium acetate, ammonium nitrate, &c. To precipitate the dissolved bases, air and carbonic acid are used.

In carrying out my improved process the free bases may either be removed singly or they may be removed jointly, the latter method being used when it is intended to separate the free bases from each other.

First. For removing lime, magnesia, and manganous oxide, the slag, after being reduced to a fine powder, is treated at ordinary temperature with a solution of one of the above-named ammonium salts. By such treatment the acid constituent of the ammonium salt combines with calcium, magnesium, and manganese, forming salts with them, while ammonia is liberated. When ammonium chloride is used, the effect is to produce calcium chloride, magnesium chloride, manganous chloride, and free ammonia. The use of ammonium acetate yields the acetates of the free bases and free ammonia. The solution thus obtained is then separated from the residue by filtering.

Second. For removing alumina and ferrous oxide, the residue not acted upon by the treatment just described is boiled for some time with one of the above-mentioned ammonium salts, air being carefully excluded, while the ammonia distills over and is condensed, and thus saved. By this boiling process alumina and ferrous oxide are dissolved, and are then filtered from the remaining phosphates and silicates.

Third. For separating the dissolved salts in the shape of solid bodies, the liquid obtained at ordinary temperature by the first treatment, which contains the salts of calcium, magnesium, manganese, and also free ammonia and undecomposed ammonium salt, is brought into contact with air. This causes the manganous oxide to take up more oxygen and to separate in the form of peroxide, together with parts of lime, the acid combining with the ammonium oxide. The liquid is next filtered, and carbonic acid introduced into the filtrate. This causes first the lime and then the magnesia to precipitate, the ammonium salt being regenerated at the same time. Any ammonia that has escaped is replaced by adding gas-water.

Fourth. For separating alumina and iron, the filtered solution obtained by boiling with ammonium salts is reunited with the distilled ammonia, thus precipitating alumina-containing parts of the iron. Air being then introduced, the iron in the solution is precipitated in the form of hydroxide. During this process the acid of the aluminum and iron salts recombines with the ammonia, thus effecting the regeneration of the ammonium salt that originally may have been used.

Where it is not intended to separate these bases from each other the powdered slag may directly be treated by a boiling solution of some of the ammonium salts, while the escaping ammonia is condensed. The solution is then filtered from the residue, and air mixed with carbonic acid is introduced into it. The effect is to precipitate all the dissolved oxides simultaneously, and at the same time to regenerate the ammonium salt.

Having thus described my invention, I claim as new and desire to secure by Letters Patent—

1. The process herein described of treating basic slag for utilizing the free bases contained therein, which consists, first, in treating the pulverized slag with a solution of ammonium salts and filtering off the dissolved lime, magnesia, and manganous oxide therefrom; second, in boiling the residue with a solution of ammonium salt and filtering off the dissolved alumina and ferrous oxide; third, in oxidizing and precipitating the dissolved salts of manganous oxide by introducing air into the ammoniacal solution; fourth, in precipitating the salts of calcium and magnesium dissolved by the introduction of carbonic acid; and, finally, in effecting the oxidation and precipitation of the ferrous oxide by introducing air in the presence of ammonia, substantially as set forth.

2. The process herein described of treating basic slag for separating the free bases contained therein, which consists in treating the pulverized slag at the boiling temperature with a solution of a suitable ammonium salt, filtering off the solution from the residue, and treating the filtered solution with a mixture of air and carbonic acid in the presence of ammonia to precipitate the dissolved oxides, substantially as and for the purpose set forth.

3. In the process of treating basic slag for utilizing the free bases contained therein, treating the ammoniacal solution containing the dissolved free bases with air and carbonic acid in presence of ammonia, so as to regain the ammonium salt originally employed, substantially as set forth.

In testimony whereof I have signed my name to this specification in the presence of two subscribing witnesses.

GOTTLIEB DEUMELANDT.

Witnesses:
B. ROI,
G. H. SMITH.